(No Model.)

P. CLOSS.
EYEGLASS CASE.

No. 339,267. Patented Apr. 6, 1886.

WITNESSES
J. Cullen Ayer
W. J. Cambridge

INVENTOR
Peter Closs
By his Attorney
F. E. Teschemacher

UNITED STATES PATENT OFFICE.

PETER CLOSS, OF CAMBRIDGEPORT, ASSIGNOR TO ANDREW J. LLOYD, OF BOSTON, MASSACHUSETTS.

EYEGLASS-CASE.

SPECIFICATION forming part of Letters Patent No. 339,267, dated April 6, 1886.

Application filed November 1, 1884. Serial No. 147,039. (No model.)

*To all whom it may concern:*

Be it known that I, PETER CLOSS, of Cambridgeport, Middlesex county, Massachusetts, have invented certain new and useful Improvements in Eyeglass-Cases, of which the following is a specification.

My invention relates to a pocket-case constructed with special reference to its use in connection with what are commonly known as "eyeglasses," in which the two lenses are united by an intermediate spring-connection adapted to clasp the nose of the user.

It is the aim of my invention to produce a case in which the glasses will be held securely in position, and the lenses protected from injury or abrasion, and which will at the same time permit the glasses to be conveniently inserted and removed.

To this end it consists, essentially, of a case consisting of two leaves hinged together at one edge, one leaf being provided with a central projection adapted to be clasped by the nose-spring of the glasses, to retain them in position thereon previous to the closing of the case, and the opposite leaf is provided with a recess to receive the aforesaid projection.

Figure 1:
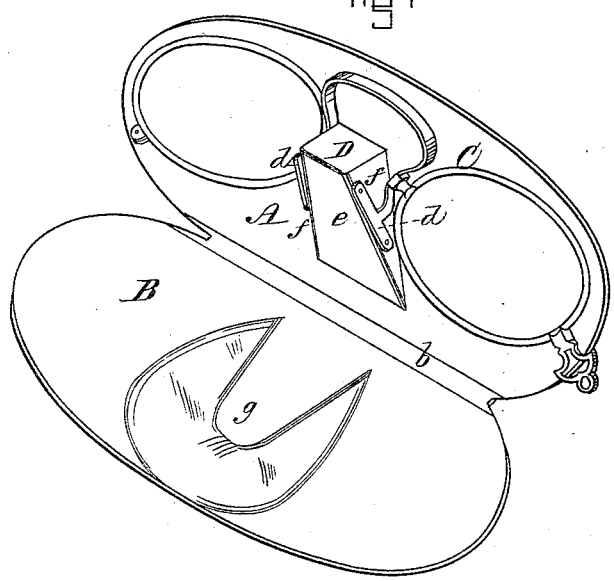
Figure 2:
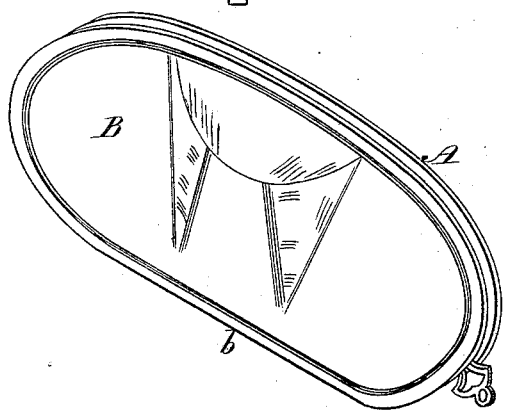
Figure 3:
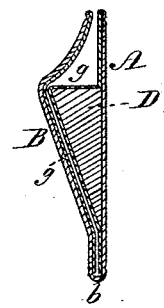

Referring to the accompanying drawings, Figure 1 represents a perspective view of my improved case in an open position with the eyeglasses secured thereto. Fig. 2 is a perspective view of the case in its closed position. Fig. 3 is a central cross-section of the case.

Referring to the drawings, A and B represent the two parts or leaves, commonly constructed of an oblong form, as shown in the drawings. They are identical in size and marginal form, and are hinged together along one edge, as shown at $b$, so that they may be closed together, one upon the other. The leaf A is commonly made of a flat form, and is provided with an elevated wedge-shaped block, D, located at its middle, and adapted to be grasped firmly by the spring or nose-piece of the glasses. The leaf B is made of a concave form to fit over and around the glasses, and is provided at the middle with an elevated portion, $g$, to receive the block D, in order that the leaf B may be closed down snugly over and around the glasses, to hold them in position.

In the drawings I have represented a pair of glasses having nose-pieces or guards $d$ lying in planes oblique to the glasses, so that they prevent the lenses from being folded or closed together, and in connection with glasses of this form my case will be found of particular advantage.

Among other advantages attending the use of my case are the maintenance of the glasses in the form in which they are to be used, so that the tension of the connecting-spring is not affected; the fact that the glasses embracing the block D are held securely in position, so that the lenses will not be abraded or injured by moving about in contact with the inner surface of the case; the fact that the glasses may be instantly inserted and removed, and the important fact that the glasses may be inserted without the slightest friction upon or abrasion of the surfaces of the lenses.

Owing to the use of the block to retain the glasses in position, it is unnecessary to employ fastening devices to hold the case closed, and unnecessary to have the edges of the case overlap or interlock.

When the device is carried in the pocket, it will be held thereby in a closed position.

I am aware that cases of various forms have been constructed to receive eyeglasses and other objects, and that boxes and cases of various kinds have been provided with internal projections or bearings to hold their contents in position; but I believe myself to be the first to produce a folding case adapted to contain an eyeglass, and provided with projections adapted to be clasped by the nose-pieces in such manner as to hold the glasses in position therein.

Having thus described my invention, what I claim is—

1. As a new article of manufacture, the herein-described eyeglass-case, consisting of the two leaves hinged together, one of said leaves being provided with a central projection formed and arranged to be clasped by the spring or nose-piece of the glasses.

2. The herein-described case for eyeglasses, consisting of the flat leaf A, having the central projection, D, thereon, and the concave leaf B, hinged to the leaf A, and formed with the concave $g$ therein.

3. A pocket-case for the protection of eyeglasses, consisting of two leaves hinged together, and adapted to close flatly together without overlapping or interlocking at the periphery, one of said parts provided with a central projection adapted to be grasped by the nose-piece or spring of the glasses, as described, whereby the glasses are retained in position without the use of peripheral flanges or locking devices on the case.

Witness my hand this 29th day of October, A. D. 1884.

PETER CLOSS.

In presence of—
P. E. TESCHEMACHER,
W. J. CAMBRIDGE.